United States Patent
Tikayatray et al.

(10) Patent No.: US 12,475,200 B2
(45) Date of Patent: Nov. 18, 2025

(54) ACCOUNT CREDENTIAL RESET AND RECONCILIATION

(71) Applicant: Dell Products L.P., Round Rock, TX (US)

(72) Inventors: Lokajit Tikayatray, Bangalore (IN); David John Linsey, Marietta, GA (US); Gireesh P, Kollam (IN); Saumya Jain, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 17/929,055

(22) Filed: Sep. 1, 2022

(65) Prior Publication Data

US 2024/0078296 A1 Mar. 7, 2024

(51) Int. Cl.
*G06F 21/31* (2013.01)

(52) U.S. Cl.
CPC .................................... *G06F 21/31* (2013.01)

(58) Field of Classification Search
CPC ...................................................... G06F 21/31
USPC ............................................................ 726/6
See application file for complete search history.

(56) References Cited

U.S. PATENT DOCUMENTS

| | | | | |
|---|---|---|---|---|
| 8,015,596 B2* | 9/2011 | Wray | ................. | G06F 21/6218 726/5 |
| 9,954,867 B1* | 4/2018 | Johansson | ............... | G06F 21/31 |
| 10,754,506 B1* | 8/2020 | Moyal | ................. | G06F 3/04842 |
| 2010/0175115 A1* | 7/2010 | Choi | ..................... | H04L 9/3226 726/6 |
| 2013/0086658 A1* | 4/2013 | Kottahachchi | .......... | H04L 63/10 726/6 |
| 2013/0167209 A1* | 6/2013 | McBride | ................. | G06F 21/41 726/6 |
| 2014/0237564 A1* | 8/2014 | Dudziak | ................. | H04L 63/08 726/6 |
| 2015/0286816 A1* | 10/2015 | Adler | .................... | H04L 63/083 726/6 |
| 2016/0357955 A1* | 12/2016 | Kruse | ...................... | G06F 21/31 |
| 2018/0241756 A1* | 8/2018 | Johansson | ............. | H04L 63/083 |
| 2020/0004946 A1* | 1/2020 | Gilpin | ...................... | H04L 9/50 |
| 2022/0086142 A1* | 3/2022 | Hecht | .................... | H04L 63/102 |
| 2022/0269811 A1* | 8/2022 | Gummadivalli | .......... | G06F 9/54 |

(Continued)

*Primary Examiner* — Hee Soo Kim

(74) *Attorney, Agent, or Firm* — DALY, CROWLEY, MOFFORD & DURKEE, LLP

(57) ABSTRACT

An example methodology includes, by a computing device, determining that a reset of credentials associated with one or more service accounts is to be performed. The method also includes, by the computing device, responsive to a determination that the reset of the credentials is to be performed, shutting down instances of applications in which the one or more service accounts are used and resetting the credentials associated with the one or more service accounts, wherein resetting the credentials updates current credentials associated with the one or more service accounts to new credentials. The method further includes, by the computing device, propagating the new credentials to the applications in which the one or more service accounts are used and starting the instances of the applications in which the one or more service accounts are used, wherein the started instances of the applications use the new credentials.

16 Claims, 5 Drawing Sheets

(56) References Cited

U.S. PATENT DOCUMENTS

| | | | |
|---|---|---|---|
| 2023/0079608 A1* | 3/2023 | Chen | H04L 9/0891 380/277 |
| 2023/0129951 A1* | 4/2023 | Do | G06F 11/3684 717/124 |
| 2023/0195443 A1* | 6/2023 | Eberlein | G06F 16/27 717/170 |
| 2023/0334140 A1* | 10/2023 | Vemula | G06F 21/44 |

* cited by examiner

ACCOUNT CREDENTIAL RESET AND RECONCILIATION

BACKGROUND

Software applications may access systems (e.g., external systems), such as data repositories, services, and other applications and systems that are external to the applications, to retrieve and store data, launch processes, perform transactions, and the like. These external systems may require the applications to provide security credentials to access to the system. For example, an external system may require an application to provide access credentials (e.g., a username and password) which are authenticated prior to granting access to the external system. On the external systems, the access credentials may be associated with service accounts which are non-user accounts that are used by applications or services to access the external systems. However, these non-user accounts are at the risk of being compromised.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, determining that a reset of credentials associated with one or more service accounts is to be performed. The method also includes, by the computing device, responsive to a determination that the reset of the credentials associated with the one or more service accounts is to be performed, shutting down instances of applications in which the one or more service accounts are used and resetting the credentials associated with the one or more service accounts, wherein resetting the credentials updates current credentials associated with the one or more service accounts to new credentials. The method further includes, by the computing device, propagating the new credentials to the applications in which the one or more service accounts are used and starting the instances of the applications in which the one or more service accounts are used, wherein the started instances of the applications use the new credentials.

In some embodiments, the method further comprises, responsive to the determination that the reset of the credentials associated with the one or more service accounts is to be performed, determining that necessary approvals to perform the reset of the credentials is obtained In some embodiments, the method further comprises, responsive to the determination that the reset of the credentials associated with the one or more service accounts is to be performed, marking down one or more of instances of load balancers being utilized by the instances of the applications, network addresses of servers hosting the instances of the applications, or network routes to the instances of the applications.

In some embodiments, resetting the credentials associated with the one or more service accounts includes utilizing an enterprise vault to reset the credentials.

In some embodiments, propagating the new credentials to the applications includes storing the new credentials within an application vault.

In some embodiments, starting the instances of the applications includes, by the instances of the applications, connecting to a configuration service and retrieving their service accounts and the new credentials associated with the service accounts from the configuration service.

In some embodiments, starting the instances of the applications includes retrieving, by the instances of the applications, their service accounts and the new credentials associated with the service accounts from an application vault.

In some embodiments, the method further comprises smoke testing the started instances of the applications.

In some embodiments, the method further comprises, responsive to successfully smoke testing the started instances of the applications, marking up one or more of instances of load balancers being utilized by the instances of the applications, network addresses of servers hosting the instances of the applications, or network routes to the instances of the applications.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
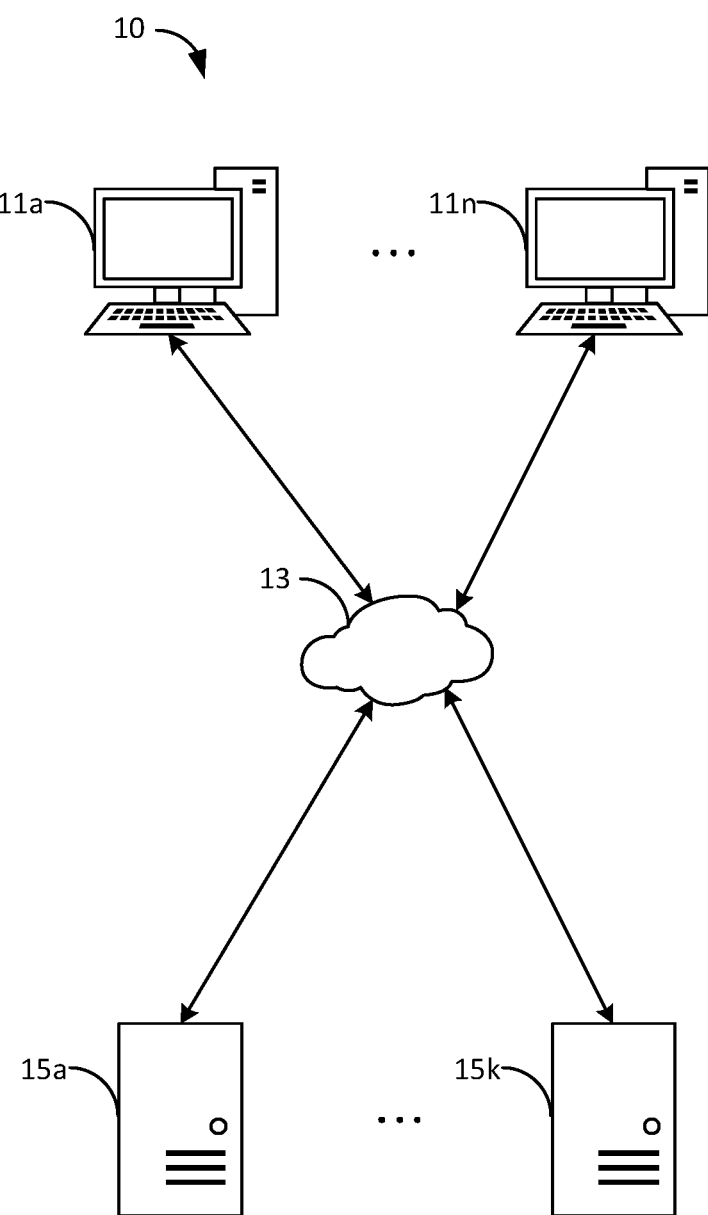
FIG. 1 is a diagram illustrating an example network environment of computing devices in which various aspects of the disclosure may be implemented, in accordance with an embodiment of the present disclosure.

Cyberattackers and other malicious actors are focusing on non-user accounts to gain unauthorized access to systems to steal data, access functions and restricted areas of the systems, and otherwise compromise the system. Organizations, such as companies and enterprises, typically have very large numbers of these risky accounts. For example, it is not uncommon for a company to have more service accounts than employees. Organizations realize the importance of protecting their account credentials to keep their applications and data safe and secure and may implement a credential rotation policy. Credential rotation is a process by which access credentials, such as passwords, certificates, and keys, used by an organization's applications are regularly changed. Limiting the lifespan of access credentials reduces vulnerability by condensing the window of time during which a stolen credential may be valid (e.g., may be used). For example, development or security teams within the organization may regularly change or reset access credentials to ensure that the applications are not compromised, and their data is protected. Organizations may employ credential management tools to regularly change the access credentials. However, these tools lack the ability to update the access credentials on applications (or "dependent applications") that use the access credentials and, thus, are unable to reconcile the updated access credentials. As a consequence, when access credentials are changed, the access credentials are usually manually updated for each dependent application. For organizations that maintain large numbers of accounts, rotating the access credentials can be burdensome on the personnel tasked to rotate the access credentials. Furthermore, depending on the number of accounts that need to be maintained, the manual reconciliation of the access credentials can be complex, effort-intensive, and error prone.

Certain embodiments of the concepts, techniques, and structures disclosed herein are directed to an automated credential reset technique through which access credentials used by applications can be reset and reconciled. The access credentials are typically associated with service accounts. In some embodiments, a credential reconciliation service enables generating a credential reset schedule which specifies the dates and times at which access credentials (sometimes referred to herein more simply as "credentials") associated with service accounts are to be reset and reconciled. As dictated by a generated credential reset schedule, the credential reconciliation service can determine which credentials are to be reset and the applications in which the credentials are used. That is to say, the credential reconciliation service can determine which service accounts, e.g., service account credentials, are to be reset and the applications in which the service accounts are used. Non-limiting examples of such credentials include passwords, certificates, tokens, and keys, among others.

To reset the credentials (e.g., update the current credentials associated with the service accounts to new credentials), the credential reconciliation service can shut down the instances of the applications (or "application instances") which use the service accounts. In cases where load balancers are being used by the application instances, the credential reconciliation service may mark down (e.g., disable) the instances of the load balancers, network addresses (e.g., Internet Protocol addresses), and/or network routes to the application instances. In this way, the credential reconciliation service ensures that no network or application traffic is sent to the application instances when the application instances are shut down for the credential reset. The credential reconciliation service can then reset the credentials associated with the service accounts. Once the credentials are reset, the credential reconciliation service can propagate the new credentials associated with the service accounts to the applications in which the service accounts are used. The credential reconciliation service can then start (e.g., restart) the application instances which were shut down. When the application instances are starting (e.g., restarting), the application instances can retrieve the service accounts and the new credentials for use by the application instances. The credential reconciliation service can then test (e.g., smoke test) the application instances to ensure that they are running correctly.

The techniques described herein provide an automated, end-to-end process for resetting credentials associated with service accounts used by applications. The described techniques improve the field of computing and, particularly, security and application authentication by providing a new system for rotating credentials associated with service accounts. Additionally, the described techniques improve the functioning of computers by preventing (and ideally eliminating) credential leakage by resetting the credentials without human intervention. These and other advantages, configurations, modifications, and embodiments will be apparent in light of this disclosure.

Turning now to the figures, FIG. 1 is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
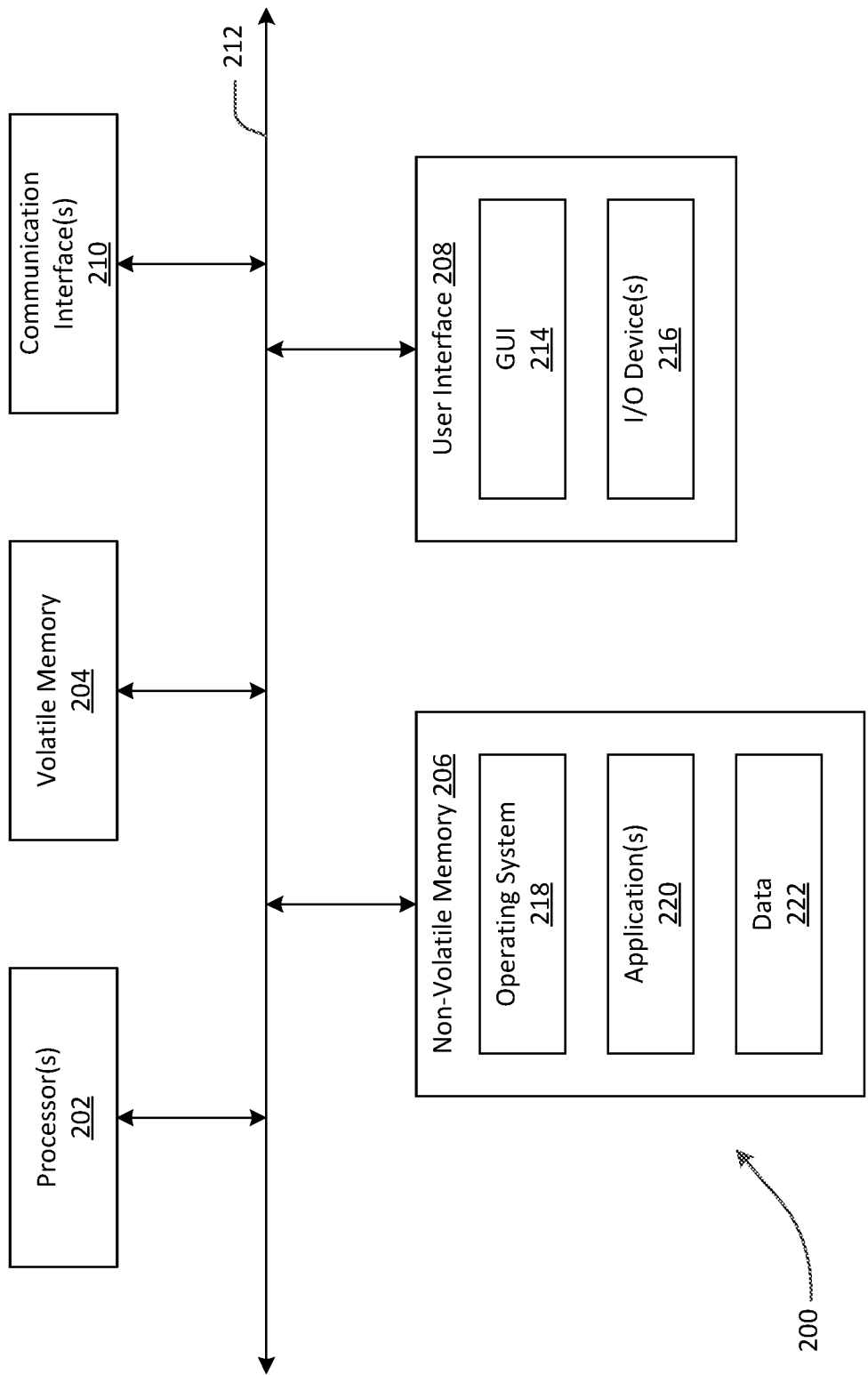
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein. In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
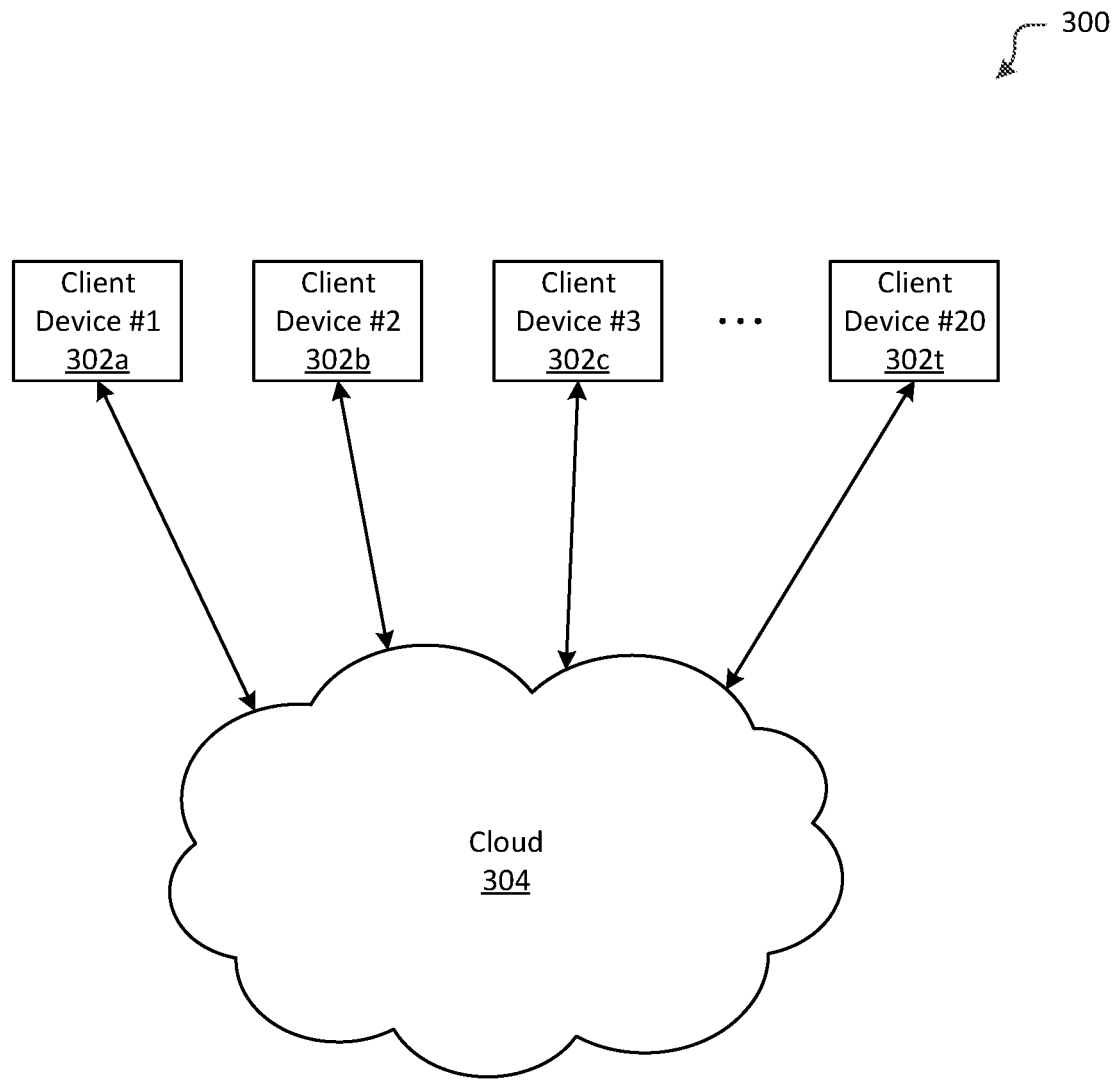
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
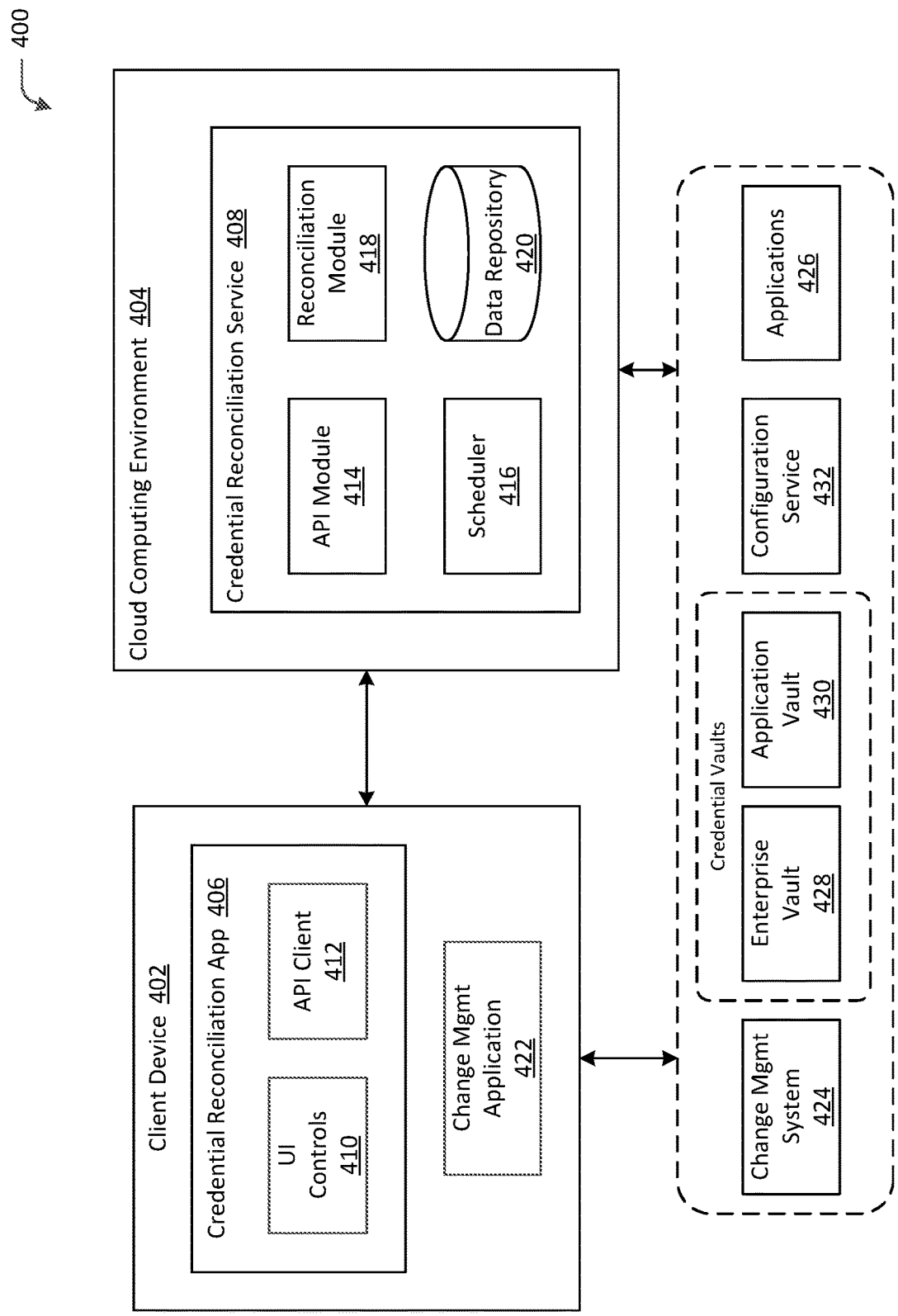
FIG. 4 is a block diagram of a system for credential reset, in accordance with an embodiment of the present disclosure.

FIG. 4 is a block diagram of a system 400 for credential reset, in accordance with an embodiment of the present disclosure. Illustrative system 400 includes a credential reconciliation application 404 installed on a client device 402 and configured to communicate with a cloud computing environment 406 via one or more computer networks. Client device 402 and cloud computing environment 406 of FIG. 4 can be the same as or similar to client 11 of FIG. 1 and cloud computing environment 300 of FIG. 3, respectively.

As shown in FIG. 4, a credential reconciliation service 408 can be provided as a service (e.g., a microservice) within cloud computing environment 406. Credential reconciliation application 404 and credential reconciliation service 408 can interoperate to automatically reset credentials associated with service accounts, as variously disclosed herein. To promote clarity in the drawings, FIG. 4 shows a single credential reconciliation application 404 communicably coupled to credential reconciliation service 408. However, embodiments of credential reconciliation service 408 can be used to service many credential reconciliation applications (e.g., credential reconciliation application 404) installed on clients (e.g., client devices 402) associated with one or more organizations and/or users. Credential reconciliation application 404 and/or credential reconciliation service 408 may be implemented as computer instructions executable to perform the corresponding functions disclosed herein. Credential reconciliation application 404 and credential reconciliation service 408 can be logically and/or physically organized into one or more components. In the example of FIG. 4, credential reconciliation application 404 includes UI controls 410 and an application programming interface (API) client 412. Also, in this example, credential reconciliation service 408 includes an API module 414, a scheduler module 416, a reconciliation module 418, and a data repository 420.

The client-side credential reconciliation application 404 can communicate with the cloud-side credential reconciliation service 408 using an API. For example, credential reconciliation application 404 can utilize API client 412 to send API requests (or "messages") to credential reconciliation service 408 wherein the API requests are received and processed by API module 414 or one or more other components of credential reconciliation service 408. Likewise, credential reconciliation service 408 can send API responses/messages to credential reconciliation application 404 wherein the API responses/messages are received and processed by API client 412 or one or more other components of credential reconciliation application 404.

Credential reconciliation application 404 can include various UI controls 410 that enable a user, such as an application team member within or associated with an organization, to access and interact with credential reconciliation service 408. For example, UI controls 410 can include controls, such as date and time pickers, that a user can use to select a date and a time to schedule a credential reset (e.g., a credential reset process). UI controls 410 can also include controls, such as list boxes and text fields, that the user can use to select (e.g., specify) the service accounts and/or the credentials which are to be reset and the applications in which the specified service accounts are used. That is to say, UI controls 410 can include controls that the user can use to create a mapping between the specified service accounts and the applications in which those service accounts are used. UI controls 410 can also include controls that the user can click/tap to request a scheduling of a credential reset at the selected date and time. The scheduling of the credential resets can be based on an organizational policy or a user preference. In response to the user input, credential reconciliation application 404 can send a message to credential reconciliation service 408 requesting the scheduling of the credential reset.

In some embodiments, credential reconciliation application 404 can include various UI controls 410 that enable a user to monitor the credential reset processing by credential reconciliation service 408. For example, UI controls 410 can include controls that the user can click/tap to request the status of a credential reset. In response to the user's input, credential reconciliation application 404 can send a message to credential reconciliation service 408 requesting a status of a credential reset and, in response, receive the status of the credential reset being performed by credential reconciliation service 408. Credential reconciliation application 404 can then display the received status via a UI control, for example. Thus, credential reconciliation application 404 enables the user to track the progress of the credential reset being performed by credential reconciliation service 408.

In the example of FIG. 4, in addition to credential reconciliation application 404, various other applications can be installed on client device 402, such as a change management application 422. Change management application 422 can communicate with a change management system 424. Change management system 424 may correspond to SERVICENOW or another tool/application that can provide management of digital workflows for the organization's enterprise operations such as, for example, credential reset and reconciliation processing by credential reconciliation service 408. For example, a user can use change management application 422 to create a ticket within change management system 424 for tracking a credential reset process. As another example, a user can use change management application 422 to create a ticket within change management system 424 to request and obtain the necessary approval(s) to perform a credential reset process. As still another example, a user can use change management application 422 to check for any incidents associated with a credential reset process (e.g., credential reconciliation service 408 may create an incident ticket or report to notify of a failure or error in or during the credential reset process).

In the embodiment of FIG. 4, credential reconciliation application 404 is shown as a stand-alone client application. In other embodiments, credential reconciliation application 404 may be implemented as a plug-in or extension to another application on client device 402, such as, for example, change management application 422. In such embodiments, UI controls 410 may be accessed within the other application in which credential reconciliation application 404 is implemented (e.g., accessed within change management application 422).

Referring to the cloud-side credential reconciliation service 408, scheduler module 416 is operable to facilitate the generating of credential reset schedules. As explained above, a credential reset schedule specifies the dates and times at which credentials associated with service accounts are to be reset and reconciled. For example, in response to a request to schedule a credential reset being received, scheduler module 416 can generate a credential reset schedule to reset one or more service accounts. The service accounts which are to be reset, along with the dates and times the credential reset is to occur and applications in which the service accounts are used may be indicated with the request. Scheduler module 416 can store the generated credential reset schedule along with other data and information regarding the credential reset schedule (e.g., the mapping between the service accounts and the applications in which those service accounts are used) within data repository 420 where it can subsequently be retrieved and used (e.g., retrieved and used to perform the scheduled credential reset). In some embodiments, data repository 420 may correspond to a storage service within the computing environment of credential reconciliation service 408.

In some embodiments, scheduler module 416 is configured to initiate (or "trigger") a credential reset. For example, scheduler module 416 can retrieve a generated credential reset schedule from data repository 420. Then, as dictated by the credential reset schedule (e.g., at the dates and times specified by the credential reset schedule), scheduler module 416 can send a request for a credential reset to reconciliation module 418 that causes reconciliation module 418 to perform a credential reset process. The request for a credential reset can indicate the service accounts which are to be reset and the applications in which the service accounts are used.

Reconciliation module 418 is operable to perform a credential reset process to reset credentials associated with service accounts. That is to say, reconciliation module 418 can update the current credentials associated with service accounts to new credentials. For example, reconciliation module 418 can perform a credential reset process in response to receiving a request for a credential reset from scheduler module 416. In some embodiments, a credential reset process may operate as follows. In some embodiments, reconciliation module 418 can optionally integrate with a change management system used by the organization, such as change management system 424, and create a new task (or "ticket") for tracking the credential reset process. In one implementation, reconciliation module 418 can communicate or otherwise interact with change management system 424 utilizing an API, such as, for example, a web API, provided or otherwise made available by change management system 424. For example, in one such embodiment, reconciliation module 418 can create a change ticket within change management system 424 to request and obtain the necessary approval(s) to perform the credential reset. In cases where a change ticket for the credential reset already exists within change management system 424 (e.g., a change ticket to obtain the necessary approvals already exists within change management system 424), reconciliation module 418 can use the existing change ticket. In any case, in such embodiments, prior to performing the credential reset, reconciliation module 418 can check to determine that the requested approvals are received prior to performing the credential reset. In other embodiments, scheduler module 416 can check change management system 424 to determine that the requested approvals are received prior to sending the request for a credential reset to reconciliation module 418. For example, scheduler module 416 can send the request for a credential reset to reconciliation module 418 upon determining that the requested approvals have been received.

Once the requested approvals have been received, reconciliation module 418 can shut down the instances of the applications (or "application instances") which use the service accounts. As explained above, the request for a credential reset can indicate the applications in which the service accounts are used. Additionally or alternatively, in some embodiments, reconciliation module 418 can determine the applications in which the service accounts are used from a mapping between the service accounts and the applications stored within data repository 420. In the example of FIG. 4, applications 426 may represent the applications in which the service accounts are used. In one implementation, reconciliation module 418 can communicate or otherwise interact with the instances of applications 426 utilizing respective APIs, such as, for example, a Representational State Transfer (REST) API, provided or otherwise made available by applications 426. When interacting with the instances of applications 426, for example, to shut down the instances of applications 426, reconciliation module 418 may need to show that it possesses sufficient privileges to perform the requested action. Shutting down the instances of applications 426 which use the service accounts ensures that these application instances do not continue to use the old credentials (e.g., the current credentials) associated with the service accounts while the service accounts are being updated with new credentials.

In some cases, reconciliation module 418 may mark down (e.g., disable) the instances of load balancers being utilized by the instances of applications 426. That is, reconciliation module 418 may disable the request redirection to the application instances (i.e., instances of applications 426) such that the load balancer knows not to forward any request to the application instances. For example, the instances of applications 426 may be utilizing load balancers to receive network or application traffic. In the case where an instance of application 426 is in a cloud environment (e.g., the application instance is an instance of a cloud application), reconciliation module 418 may mark down the routes to the instance of application 426 in the cloud environment itself. In the case where an instance of application 426 is deployed on a server, reconciliation module 418 may mark down the network addresses (e.g., Internet Protocol addresses) and/or Uniform Resource Locators (URLs) to the server. In any of these cases, marking down the load balancers/network addresses/network routes ensures that network or application traffic is not sent to the instances of applications 426 when they are shut down for the credential reset, for example. Note that, in some implementations, reconciliation module 418 may mark down the load balancers/network addresses/network routes prior to shutting down the instances of applications 426.

Once the instances of the applications which use the service accounts are shut down (e.g., the instances of applications 426 are shut down), reconciliation module 418 can reset the credentials associated with the service accounts. In some embodiments, reconciliation module 418 can generate the new credentials to use in resetting the credentials. In other embodiments, reconciliation module 418 can retrieve the new credentials to use in resetting the credentials from data repository 420. In any case, reconciliation module 418 can reset the credentials by updating the current credentials associated with the service accounts to the new credentials. In some embodiments, reconciliation module 418 can reset the credentials utilizing an enterprise vault 428. Enterprise vault 428 may correspond to CyberArk Digital Vault or another tool/application that can provide a security solution for securing the organization's sensitive information and managing and controlling all access to the securely stored sensitive information. For example, the organization may use enterprise vault 428 to securely store the credentials associated with the service accounts. Reconciliation module 418 can utilize APIs provided or otherwise made available by enterprise vault 428 to update the current credentials in enterprise vault 428 to the new credentials.

Once the credentials associated with the service accounts are reset, reconciliation module 418 can propagate the new credentials to the applications in which the service accounts are used (e.g., propagate the new credentials to applications 426). Propagating the reset credentials to the applications reconciles the credentials used by applications 426 with the reset credentials (e.g., the new credentials in enterprise vault 428). In some embodiments, reconciliation module 418 can store the new credentials within an application vault 430, where they can be subsequently retrieved and propagated to applications 426. Application vault 430 may correspond to HASHICORP VAULT or another secrets management tool/application that can provide management and control of the organization's secrets (e.g., digital authentication credentials), such as passwords, keys, APIs, and tokens, for use in applications, services, and privileged accounts, among others. For example, the organization can use application vault 430 to securely store the new credentials against their service accounts. Reconciliation module 418 can utilize APIs provided or otherwise made available by application vault 430 to store the new credentials within application vault 430. In some embodiments, the new credentials may be encrypted and stored within application vault 430.

Once the reset credentials (i.e., the new credentials) are stored within application vault 430, reconciliation module 418 can start (e.g., restart) the instances of applications 426 which were shut down. These are the application instances which use the service accounts whose credentials are reset and which were previously shut down by reconciliation module 418. Reconciliation module 418 can utilize respective APIs provided or otherwise made available by applications 426 to start the instances of applications 426. When the instances of applications 426 are starting (e.g., restarting), in some embodiments, the application instances can connect to a configuration service 432 and pull (e.g., retrieve) their application-specific configurations. That is to say, the instances of applications 426 can retrieve their configuration details, including the service accounts used by applications 426 and the credentials associated with the service accounts, from configuration service 432. Configuration service 432 may correspond to Spring Config Service or another application/tool that can provide centralized management of configurations across different applications/services. In such embodiments, when an instance of application 426 is starting, the application instance can connect to configuration service 432 and request to configuration service 432 for its configuration details. The application instance can send the request for its configuration details utilizing an API, such as a REST API, provided or otherwise made available by configuration service 432. In response to such request being received, configuration service 432 can read or otherwise retrieve from application vault 430 the service accounts configured for the application instance, including the new credentials associated with the service accounts. Configuration service 432 can retrieve the service accounts and the new credentials utilizing the APIs provided or otherwise made available by application vault 430. Configuration service 432 can then send the retrieved service accounts and the new credentials, along with the other configuration details, to the instance of application 426 in a response to the request. The instance of application 426 can then start running using the new credentials. For example, the instance of application 426 can then use the new credentials associated with the service accounts to access external systems such as external or other applications, data repositories, and communication servers.

In other embodiments, applications 426 can retrieve their service accounts and the new credentials associated with the service accounts from application vault 430. For example, the configuration details may be included within applications 426 (e.g., the configuration details may be included within the application code). In such embodiments, the instances of applications 426 can retrieve their service accounts and the new credentials from application vault 430 utilizing the APIs provided or otherwise made available by application vault 430.

In some embodiments, reconciliation module 418 can smoke test the instances of applications 426 once they restarted to ensure that the main functions of the application instances are working correctly. For example, in one implementation, reconciliation module 418 can make service calls to health check APIs exposed or otherwise made available by applications 426 to ensure that the server(s) hosting the application instances started successfully and that the instances of applications 426 are running correctly. Reconciliation module 418 may also perform other tests on the instances of applications 426 to ensure that the instances of applications 426 are running correctly.

In some embodiments, reconciliation module 418 can mark up (e.g., enable) the instances of load balancers being utilized by the instances of applications 426. These include the instances of the load balancers which were marked down for the credential reset. Reconciliation module 418 can mark up the instances of the load balancers utilizing APIs provided or otherwise made available by the load balancers. For example, reconciliation module 418 can mark up the instances of the load balancers upon successful completion of the smoke testing of the instances of applications 426. Marking up the instances of the load balancers ensures that the instances of applications 426 (e.g., the restarted application instances) receive network and application traffic after the reset of the credentials used by the instances of applications 426.

In some embodiments, upon successfully completing the credential reset, reconciliation module 418 can notify an appropriate team (e.g., team member(s)) within or associated with the organization of the successful reset of the credentials. For example, reconciliation module 418 can cause a notification, such as an email, informing of the successful completion of the credential reset process to be sent. The notification method and the recipient(s) of the notification may be configurable by the organization (e.g., it can be configured as an organizational policy).

In some embodiments, upon completing the credential reset, reconciliation module 418 can update change management system 424 with a status indicating the completion of the credential reset. For example, reconciliation module 418 can update change management system 424 with a status indicating either a successful completion or an unsuccessful completion of the credential reset process. Updating change management system 424 with the latest status allows change management system 424 to close the ticket created for the credential reset.

In some embodiments, reconciliation module 418 can monitor the execution of the credential reset process. For example, reconciliation module 418 can monitor for errors or failures in or during the execution of the credential reset process. In such embodiments, upon detecting an error or a failure, reconciliation module 418 can connect to the organization's incident management system (not depicted) and create an incident to report the error/failure. Reconciliation module 418 can utilize an API provided or otherwise made available by the incident management system to create the incident reporting the error/failure. The incident management system can then report the incident to the appropriate team within the organization through an incident notification process defined by the organization. In some embodiments, reconciliation module 418 can determine the status of the credential reset at various stages of the credential reset process and store the status information (e.g., indication of the determined status) within data repository 420, where it can subsequently be retrieved and used. For example, the status information may be retrieved and sent or otherwise provided to credential reconciliation application 406 for presenting to a user via UI controls 410.

In the example of FIG. 4, a particular change management system 424, enterprise vault 428, application vault 430, and configuration service 432 can be hosted within a cloud computing environment (e.g., the cloud computing environment 404 or a different cloud computing environment) or within an on-premises data center (e.g., an on-premises data center of an organization that utilizes credential reconciliation service 408). Additionally, the particular change management system 424, enterprise vault 428, application vault 430, and configuration service 432 can vary between different organizations. In some embodiments, reconciliation module 418 may obtain authentication credentials (e.g., user ids and passwords, access tokens, etc.) needed to access one or more of change management system 424, enterprise vault 428, application vault 430, and configuration service 432. In some embodiments, reconciliation module 418 may use a single sign-on service to access one or more of change management system 424, enterprise vault 428, application vault 430, and configuration service 432.

Figure 5:
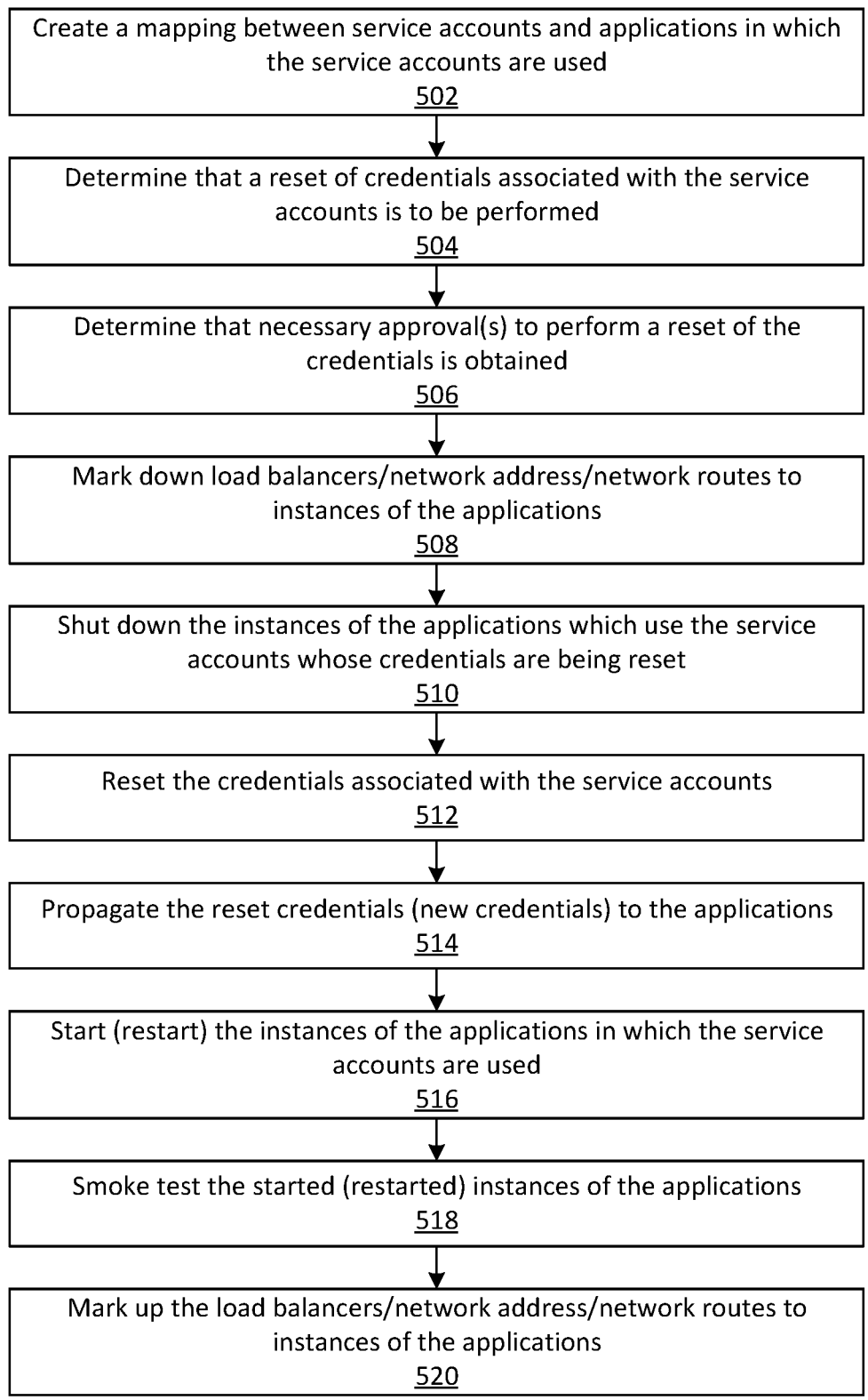
FIG. 5 is a flow diagram of an example process for resetting credentials associated with service accounts, in accordance with an embodiment of the present disclosure.

FIG. 5 is a flow diagram of an example process 500 for resetting credentials associated with service accounts, in accordance with an embodiment of the present disclosure. Illustrative process 400 may be implemented, for example, within system 400 of FIG. 4. In more detail, process 500 may be performed, for example, in whole or in part by scheduler module 416, reconciliation module 418, and data repository 420, or any combination of these including other components of system 400 described with respect to FIG. 4.

With reference to process 500 of FIG. 5, at 502, a mapping between the service accounts and the applications in which the service accounts are used may be created. The mapping indicates the service accounts whose credentials are to be reset (e.g., rotated) and the applications which need to be updated with the reset credentials. For example, an application team member associated with an organization may use a credential reconciliation application on their client device (e.g., credential reconciliation application 406 on client device 402) to create the mapping between the service accounts and the applications in which the service accounts are used. A credential reconciliation service (e.g., credential reconciliation service 408) can store the created mapping within a data repository (e.g., data repository 420).

At 504, it may be determined that a reset of credentials associated with the service accounts is to be performed. The service accounts are the service accounts included in the created mapping of the service accounts and the applications in which the service accounts. For example, a reconciliation module (e.g., reconciliation module 418) may determine that a reset of the credentials is to be performed in response to receiving a request for a credential reset. The request for a credential reset may be sent by a scheduler (e.g., scheduler module 416) as dictated by a credential reset schedule.

Alternatively, in some embodiments, the scheduler may send the request for a credential reset on-demand in response to an input. For example, a user of a credential reconciliation application (e.g., credential reconciliation application 406) may click/tap on a UI control and, in response, the credential reconciliation application may send a message to the credential reconciliation service (e.g., credential reconciliation service 408) that causes the scheduler (e.g., scheduler module 416) to send the request for a credential reset. In any case, a reset of the credentials associated with the service accounts can be initiated.

At 506, it may be determined that necessary (e.g., requested) approval(s) to perform the reset of the credentials is obtained. For example, the reconciliation module may connect to the organization's change management system (e.g., change management system 424) and check a change ticket created to track the credential reset process to determine that the requested approvals to perform the reset of the credentials have been received. Note that, if the requested approvals have not been received, the reconciliation module may wait to receive the requested approvals.

At 508, instances of load balancers/network addresses/network routes to instances of the applications which use the service accounts whose credentials are being reset may be marked down. For example, the reconciliation module may mark down the instances of the load balancers which are being utilized by the instances of the applications to ensure that network traffic is not sent to the instances of the applications via the load balancers when the instances of the applications are shut down for the credential reset. Similarly, the reconciliation module may also mark down the network addresses of the servers hosting the instances of the applications and the network routes to the instances of the applications to ensure that network or application traffic is not sent to the instances of the applications when the instances of the applications are shut down for the credential reset.

At 510, the instances of the applications which use the service accounts whose credentials are being reset may be shut down. For example, the reconciliation module may shut down the instances of the applications whose credentials are being reset to ensure that these application instances do not continue to use the old credentials (e.g., the current credentials) associated with the service accounts while the service accounts are being updated with new credentials.

At 512, the credentials associated with the service accounts may be reset. For example, the reconciliation module can reset the credentials by updating the current credentials associated with the service accounts to new credentials. In some embodiments, the reconciliation module may utilize the organization's enterprise vault (e.g., enterprise vault 428) to reset the credentials associated with the service accounts.

At 514, the reset credentials (i.e., the new credentials) associated with the service accounts may be propagated to the applications in which the service accounts are used. In some embodiments, the reconciliation module may utilize the organization's application vault (e.g., application vault 430) to propagate the new credentials. For example, the reconciliation module can store the new credentials within the organization's application vault, where they can be subsequently retrieved and propagated to the applications in which the service accounts are used.

At 516, the instances of the applications which were shut down may be started (e.g., restarted). For example, the reconciliation module may restart the instances of the applications which use the service accounts whose credentials are reset and which were previously shut down by the reconciliation module. When the instances of the applications are starting (e.g., restarting), in some embodiments, the application instances can connect to the organization's configuration service (e.g., configuration service 432) and retrieve their application-specific configurations, including their service accounts and the new credentials associated with the service accounts. In other embodiments, the application instances can retrieve their service accounts and the new credentials associated with the service accounts from the organization's application vault.

At 518, the started (restarted) instances of the applications may be smoke tested. For example, the reconciliation module may execute a set of test cases that cover the important functionality of the application against the instances of the applications to ensure that the instances of the applications are running correctly.

At 520, instances of load balancers/network addresses/network routes to the instances of the applications may be marked up. For example, upon successful smoke testing of the instances of the applications, the reconciliation module may mark up the instances of the load balancers/network addresses/network routs to the instances of the applications. This ensures that the started instances of the applications receive network and application traffic after the reset of the credentials.

In some embodiments, additional operations may be performed. For example, in one embodiment, upon completing the credential reset, the reconciliation module may update the organization's change management system with a status indicating the completion (e.g., successful completion or unsuccessful completion) of the credential reset. In another embodiment, upon successfully completing the credential reset, the reconciliation module may generate a notification, such as an email, to an appropriate team within or associated with the organization of the successful reset of the credentials.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   creating, by a computing device, a mapping between service accounts and applications in which the service accounts are used;
   determining, by the computing device, that a reset of credentials associated with one or more service accounts is to be performed; and
   responsive to a determination that the reset of the credentials associated with the one or more service accounts is to be performed, by the computing device:
      determining one or more applications in which the service accounts are used based on the mapping;
      marking down at least one of: one or more of instances of load balancers being utilized by instances of the applications in which the one or more service accounts are used, network addresses of servers hosting the instances of the applications, or network routes to the instances of the applications to ensure that network traffic is not sent to the instances of the applications when the instances of the applications are shut down when resetting the credentials associated with the one or more service accounts;
      shutting down the instances of the applications;
      resetting the credentials associated with the one or more service accounts, wherein resetting the credentials updates current credentials associated with the one or more service accounts to new credentials;
      storing the new credentials within an application vault; and
      starting the instances of the applications in which the one or more service accounts are used, wherein starting the instances of the applications includes retrieving, by the instances of the applications, their service accounts and the new credentials associated with the service accounts from the application vault, wherein the started instances of the applications use the new credentials.

2. The method of claim 1, further comprising, responsive to the determination that the reset of the credentials associated with the one or more service accounts is to be performed, determining that necessary approvals to perform the reset of the credentials is obtained.

3. The method of claim 1, wherein the marking down includes marking down the one or more of instances of load balancers being utilized by instances of the applications.

4. The method of claim 1, wherein resetting the credentials associated with the one or more service accounts includes utilizing an enterprise vault to reset the credentials.

5. The method of claim 1, wherein starting the instances of the applications includes:
   connecting, by the instances of the applications, to a configuration service; and
   retrieving, by the instances of the applications, their service accounts and the new credentials associated with the service accounts from the configuration service.

6. The method of claim 1, further comprising smoke testing the started instances of the applications.

7. The method of claim 1, further comprising, responsive to successfully smoke testing the started instances of the applications, marking up one or more of instances of load balancers being utilized by the instances of the applications, network addresses of servers hosting the instances of the applications, or network routes to the instances of the applications.

8. A computing device comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
create a mapping between service accounts and applications in which the service accounts are used;
determining that a reset of credentials associated with one or more service accounts is to be performed; and
responsive to a determination that the reset of the credentials associated with the one or more service accounts is to be performed:
determining one or more applications in which the service accounts are used based on the mapping;
marking down at least one of: one or more of instances of load balancers being utilized by instances of the applications in which the one or more service accounts are used, network addresses of servers hosting the instances of the applications, or network routes to the instances of the applications to ensure that network traffic is not sent to the instances of the applications when the instances of the applications are shut down when resetting the credentials associated with the one or more service accounts;
shutting down the instances of the applications;
resetting the credentials associated with the one or more service accounts, wherein resetting the credentials updates current credentials associated with the one or more service accounts to new credentials;
storing the new credentials within an application vault; and
starting the instances of the applications in which the one or more service accounts are used, wherein starting the instances of the applications includes retrieving, by the instances of the applications, their service accounts and the new credentials associated with the service accounts from the application vault, wherein the started instances of the applications use the new credentials.

9. The computing device of claim 8, wherein the process further comprises, responsive to the determination that the reset of the credentials associated with the one or more service accounts is to be performed, determining that necessary approvals to perform the reset of the credentials is obtained.

10. The computing device of claim 8, wherein the marking down includes marking down the one or more of instances of load balancers being utilized by instances of the applications.

11. The computing device of claim 8, wherein resetting the credentials associated with the one or more service accounts includes utilizing an enterprise vault to reset the credentials.

12. The computing device of claim 8, wherein starting the instances of the applications includes:
connecting, by the instances of the applications, to a configuration service; and
retrieving, by the instances of the applications, their service accounts and the new credentials associated with the service accounts from the configuration service.

13. The computing device of claim 8, wherein the process further comprises smoke testing the started instances of the applications.

14. The computing device of claim 8, wherein the process further comprises, responsive to successfully smoke testing the started instances of the applications, marking up one or more of instances of load balancers being utilized by the instances of the applications, network addresses of servers hosting the instances of the applications, or network routes to the instances of the applications.

15. A non-transitory machine-readable medium encoding instructions that when executed by one or more processors cause a process to be carried out, the process including:
creating a mapping between service accounts and applications in which the service accounts are used;
determining that a reset of credentials associated with one or more service accounts is to be performed; and
responsive to a determination that the reset of the credentials associated with the one or more service accounts is to be performed:
determining one or more applications in which the service accounts are used based on the mapping;
marking down at least one of: one or more of instances of load balancers being utilized by instances of the applications in which the one or more service accounts are used, network addresses of servers hosting the instances of the applications, or network routes to the instances of the applications to ensure that network traffic is not sent to the instances of the applications when the instances of the applications are shut down when resetting the credentials associated with the one or more service accounts;
shutting down the instances of the applications;
resetting the credentials associated with the one or more service accounts, wherein resetting the credentials updates current credentials associated with the one or more service accounts to new credentials;
storing the new credentials within an application vault; and
starting the instances of the applications in which the one or more service accounts are used, wherein starting the instances of the applications includes retrieving, by the instances of the applications, their service accounts and the new credentials associated with the service accounts from the application vault, wherein the started instances of the applications use the new credentials.

16. The machine-readable medium of claim 15, wherein the marking down includes marking down the one or more of instances of load balancers being utilized by instances of the applications.

* * * * *